(12) United States Patent
Hecht-Nielsen

(10) Patent No.: US 9,760,553 B1
(45) Date of Patent: Sep. 12, 2017

(54) SYSTEMS AND METHODS FOR EARLY IDENTIFICATION OF ANOMALIES IN LARGE PROJECTS

(75) Inventor: Robert Hecht-Nielsen, Del Mar, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1904 days.

(21) Appl. No.: 11/839,328

(22) Filed: Aug. 15, 2007

(51) Int. Cl.
   G06F 17/00 (2006.01)
   G06F 17/24 (2006.01)
   G06F 11/34 (2006.01)

(52) U.S. Cl.
   CPC ........ G06F 17/241 (2013.01); G06F 11/3495 (2013.01)

(58) Field of Classification Search
   CPC .......................... G06F 17/241; G06F 11/3495
   USPC .......................................... 715/232, 273, 275
   See application file for complete search history.

(56) References Cited

U.S. PATENT DOCUMENTS

| | | | |
|---|---|---|---|
| 5,317,507 A | 5/1994 | Gallant | |
| 5,325,298 A | 6/1994 | Gallant | |
| 5,619,709 A | 4/1997 | Caid et al. | |
| 6,687,878 B1 * | 2/2004 | Eintracht | G06F 17/241 707/E17.117 |
| 6,760,714 B1 | 7/2004 | Caid et al. | |
| 7,054,878 B2 * | 5/2006 | Gottsman et al. | |
| 7,076,736 B2 * | 7/2006 | Hugh | 715/743 |

(Continued)

OTHER PUBLICATIONS

Wiza et al., "Periscope—A System for Adaptive 3D Visualization of Search Results," Copyright © 2004 by the Association for Computing Machinery, Inc., p. 29-180.*

(Continued)

*Primary Examiner* — Amelia Tapp
(74) *Attorney, Agent, or Firm* — Norton Rose Fulbright US LLP

(57) ABSTRACT

The present invention is directed to a system and method which allows managers to identify anomalies in organizations, brands or projects at an early stage. Advantage is taken of the fact that a large percentage of the elements of all organizational (project) problems are promptly captured in some form on an electronic notation. Portions of these notations are abstracted into categories. Each categorized abstract is displayed in an appropriate partition for review by one or more managers. As a category becomes populated with more and more abstracts, the visual color of the representations of the abstracts of that category can change to reflect their individual ages or other attributes of that category's abstracts. For example, the color of each abstract-representing graphical "dot" can fade over time. A group of new "dots" within a category, or blinking dots representing content that is particularly well matched to the category definition can graphically signify extra concern. In one embodiment, the manager can then "click" on one or more particular "dots" within a category in order to read the particular abstracted notation or the original data item itself. If desired, chains of abstracted notations can be followed in an attempt to discern the particulars of a possible developing problem. In one embodiment, a manager can select which categories are to be displayed in different "territories" on the manager's display.

21 Claims, 4 Drawing Sheets

(56) References Cited

U.S. PATENT DOCUMENTS 7,117,199 B2 * 10/2006 Frank ................ G06F 17/30241
7,246,041 B2 *  7/2007 Fukuda et al. ................ 702/189

OTHER PUBLICATIONS

Wiza et al., "Periscope—A System for Adaptive 3D Visualization of Search Results," copyright 2004 by the Association for Computing Machinery, Inc., p. 29-180.*

* cited by examiner

SYSTEMS AND METHODS FOR EARLY IDENTIFICATION OF ANOMALIES IN LARGE PROJECTS

TECHNICAL FIELD

This application relates to large projects, brands, or corporate management and more specifically to systems and methods for allowing managers to identify problems at an early stage, which problems initially only evidence themselves buried in vast quantities of available data, at an early stage.

BACKGROUND OF THE INVENTION

The management of large complex projects, such as, for example, defense projects, is difficult. One difficulty is that as problems (anomalies) arise, the people who have the problem often do not pass the problem along to management. Sometimes this failure to report issues is deliberate and in other cases the issue(s) involved may not be recognized as a serious problem by those who are aware of them. For them, it is just one more item that must be attended to among a number of other items. Thus, it often happens that by the time tipper management becomes aware of an issue, it has become serious and sometimes project-threatening. In many instances, particularly with government-funded projects, the political process interferes (e.g., to cut off project funding) shortly after upper management becomes aware of the problem and long before remedial action can be taken. Human nature works against early solutions since workers have an incentive to not let anybody know about the problem at first; because they feel it's their job to solve the problem. Generally what happens is that a few weeks into working the issue, it becomes more and more worrisome to the primary project workers and as time goes on they become even more committed to not 'fessing up.' At some point, the project manager at a high level finds out about the problem, often just a few days before Congress or the funding agency finds out. Attempts to train employees to report problems have largely failed, because such directives directly contradict employee intuition.

In many regards, commercial brand management and corporate management organizations operate in a similar mode such that problems percolate at low levels in an organization and only become visible to upper management when they become serious, often threatening the viability of the product or corporation.

BRIEF SUMMARY OF THE INVENTION

The present invention is directed to a system and method which allows managers to identify anomalies in organizations, brands, or projects at an early stage. Advantage is taken of the fact that a large percentage of the elements of all organizational (project) problems are promptly captured in some form as an electronic notation. These notations can be e-mail, communications, reports, graphs, presentations, image/audio or video files, spreadsheets, etc., both internal and external to the organization. These notations, which can be all or part of an electronic document, are reviewed in detail and abstracted into categories. Each categorized notation (or a portion thereof) is graphically displayed as a representational "dot" in an appropriate "meaning content territory" partition of a graphical display for review by one or more managers. Newly displayed items of particular interest are accompanied by an auditory or visual alarm. As a category becomes populated with more and more categorizations, the newer dots are added in higher visibility color. Dots fade in visibility as they age. Groups of dots appearing in short succession (an "eruption") or dots which blink (signifying meaning content that precisely matches a particular pre-identified issue of concern) signify events of potentially significant concern. In one embodiment, the manager can then "click" on one or more particular "dots" within a category in order to view the particular worrying raw content in a pop-up overlay window in the display. In one embodiment, if desired by the user, groups and temporal chains of related items can be tracked to monitor and discern the particulars of a possible developing problem.

In one embodiment, a manager can select which categories are to be displayed in different "territories" on the manager's display. Thus, a manager need only monitor those areas of interest to him/her. If desired, the various groupings of "territories" can be sequenced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
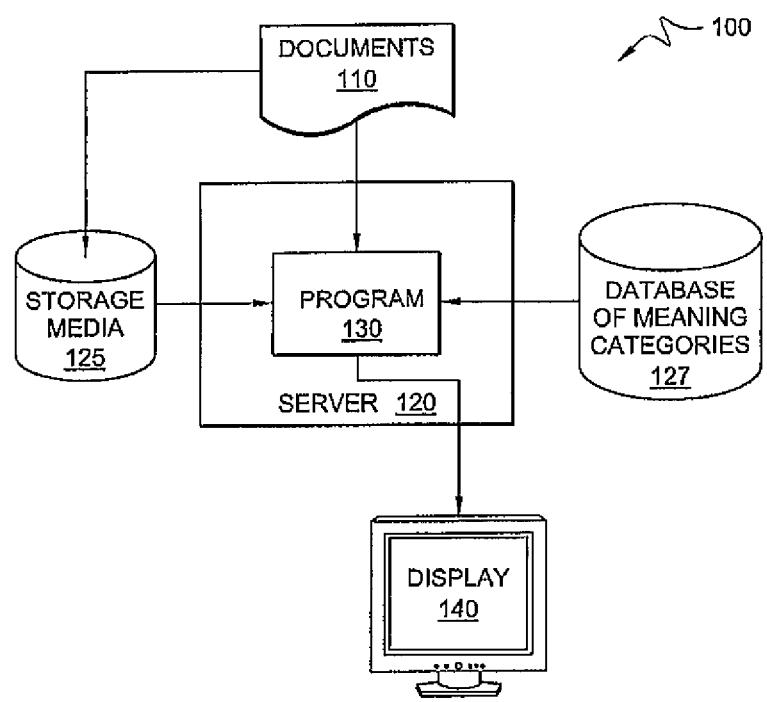
FIG. 1 is a block diagram illustrating components of the system according to one embodiment.

FIG. 1 is a block diagram illustrating components and data flow of a project management system 100 according to one illustrative embodiment. Note that for purposes of this disclosure, the word "project" is used to mean an organization, a particular brand, a campaign, of any nature, etc. System 100 includes server 120, storage media 125, database 127, program 130, and display device 140. System 100 is configured to monitor the contents of a plurality of documents 110. In one embodiment, the documents are those that are generated during the day-to-day operations of a project. In another embodiment, the documents are documents that are generated inside and/or outside the organization that is using system 100. The plurality of documents can be any number of types of documents, such as email, web pages, instant messages, word processor documents, slide presentations, article clippings, images, audio recordings, videos, radio and television programs, etc. The operation and composition of the various components of project management system 100 will be discussed in greater detail below.

Prior to analyzing the documents, the project management system 100 requires the collection of all the documents that are to be processed. The documents can be collected by any known process, and converted to electronic format if not already in such a format and stored, for example, in storage media 125. Once documents 110 are stored, the documents are read electronically, by program 130 to determine the context of the document. The process of collecting documents and providing them to the server can occur on a periodic basis, such as every day, or in some embodiments the process can occur on a continuous basis. Note also that the storage of documents can be in the same physical location and/or part of server 120 or can be fully or partially stored remote from server 120.

In one embodiment, program 130 opens up each document in documents 110 to determine the meaning of the document. Program 130 is, in one embodiment, a computer program that is stored on the server 120. However, in other embodiments, program 130 can be remote from server 120 and accessed via a remote connection. Program 130 begins with the first paragraph of the document and analyzes it. Then each subsequent paragraph is analyzed as well to determine the meaning of the document. In one embodiment, program 130 uses context vectors to determine the meaning of the document. However, other processes for determining meaning of a document can be used.

Context vectors are a method for determining the meaning of a paragraph, or sentence. Context vectors have been described in greater detail in U.S. Pat. No. 5,317,507, issued May 31, 1994, entitled "METHOD FOR DOCUMENT RETRIEVAL AND FORWARD SENSE DISAMBIGUATION USING NEURAL NETWORKS," U.S. Pat. No. 5,325,298, issued Jun. 28, 1994, entitled "METHODS FOR GENERATING OR REVISING CONTEXT VECTORS FOR A PLURALITY OF WORD STEMS," U.S. Pat. No. 5,619,709, issued Apr. 8, 1997, entitled "SYSTEM AND METHOD OF CONTEXT VECTOR GENERATION AND RETRIEVAL," and U.S. Pat. No. 6,760,714, issued Jul. 6, 2004, entitled "REPRESENTATION AND RETRIEVAL OF IMAGES USING CONTENT VECTORS DERIVED FROM IMAGE INFORMATION ELEMENTS," the contents of these patents are incorporated herein by reference in their entirety. Briefly, context vectors are vectors that point in a particular direction based on the meaning of the paragraph, and are typically generated in a large multidimensional space, such as a 100,000 dimensional space. Each paragraph in the document has a context vector generated for it by program 130.

All of the context vectors generated by program 130 originate from the same point in space, but can point in different directions. The direction in which a vector points gives the meaning context for a particular paragraph. By using context vectors it does not matter how the meaning context was of the paragraph expressed (i.e., the words used to express the idea). For example, given two paragraphs that discuss a similar topic, but do not use the same words, each paragraph will have a context vector associated with it. However, the context vectors for these two different documents will point in the same direction since they pertain to the same topic. This is because context vectors capture the actual intrinsic meaning of the paragraph without concern for what exact words were used.

In order to group documents and help identify problem areas, a number of meaning categories or territories are set up in accordance with user needs or otherwise generated. These meaning categories can be generated prior to the activation of system 100 by the user, at the first run through, or at any other time. Typically the user using system 100 knows what categories of documents and the content of those documents that will either be troublesome or will require monitoring. In one embodiment, the meaning category is created through a series of example documents. These example documents are generated from paragraphs that describe past kinds of issues that the user wishes to monitor. Sometimes it is desired to allow program 130 to establish meaning categories based on the vectors obtained from the analysis.

These example paragraphs/documents are processed through program 130 to create a context vector or a set of context vectors for the example paragraphs. These vectors are fixed and form the vector definition for the associated meaning category. These vectors are stored, for example, in a database 127 for later comparison with incoming documents. However, in other embodiments, predefined context vectors can be used.

The user of system 100 can later modify the system by adding more meaning categories in response to changing conditions. Thus, the system can have more meaning categories, can change the definition of some of the categories, or can make the categories more responsive to certain types of problems.

When documents 110 are analyzed by program. 130 each paragraph from the document has a context vector generated. This vector is then compared with the vectors stored in database 127 to determine if this vector context is pointing in a direction that is similar to those context vectors for a selected meaning category.

In one embodiment, a threshold value is used to determine if the meaning of a paragraph is similar to a meaning category when the content vectors do not match exactly. This threshold value is based on a relative closeness of the context vectors. In some embodiments, the threshold value can be changed during use, if desired, to fine tune the system to better capture the meanings. In an alternative embodiment, confabulation theory can be used to match and compare the meanings.

If during the comparison, program 130 determines the context vectors of the document and the meaning territories are not close enough the document is ignored. However, if the context vector is close to the meaning territory, program 130 causes an indication to be displayed on display device 140. In one embodiment, this indication is a "dot". In some embodiments a sudden increase in activity in a meaning category can cause an additional activity to occur. For example, an eruption of activity can cause program 130 to trigger an alarm. In other embodiments, program 130 also can generate a chart on display 140 that shows the distribution of messages/documents by dates or other values.

Figure 2:
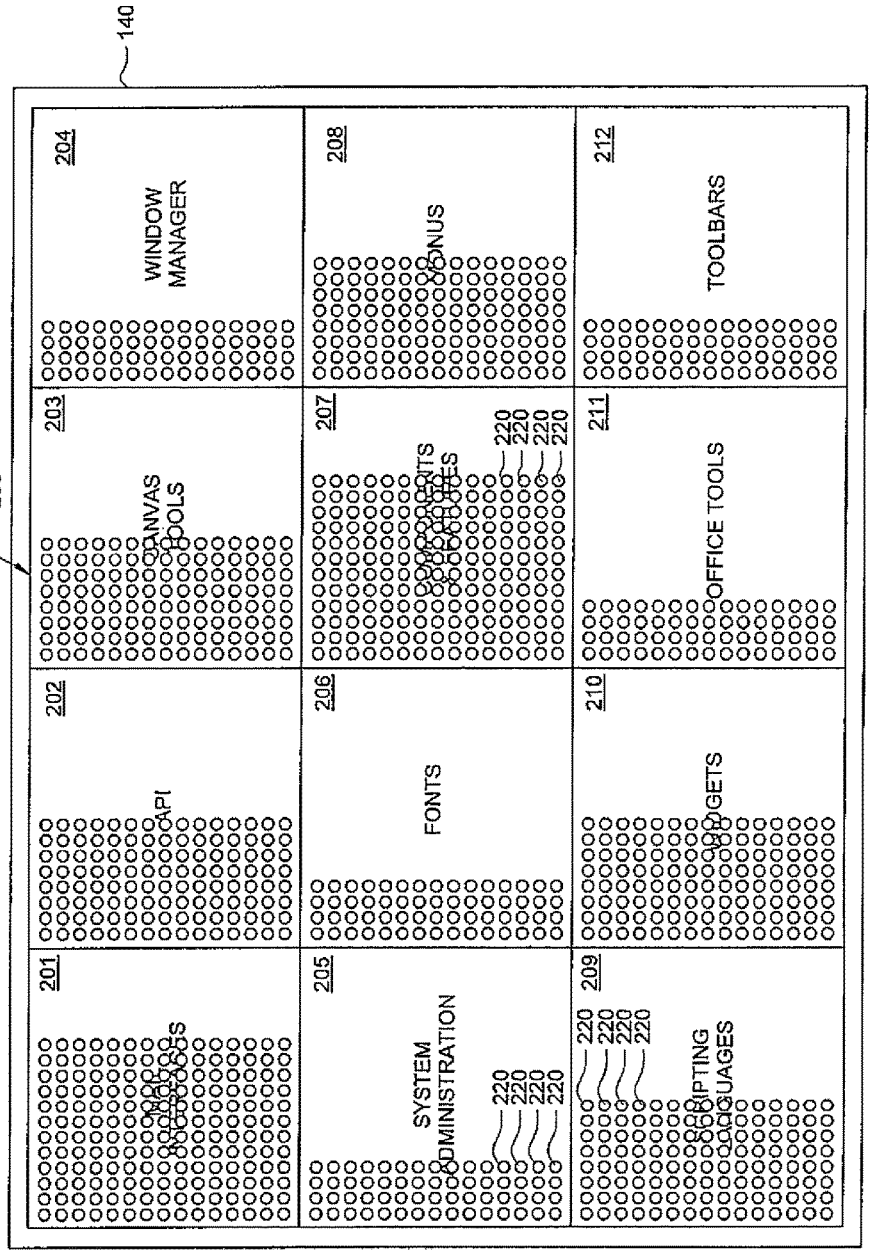
FIG. 2 is an illustrative display for management of a software development project having meaning territories according to one embodiment.

FIG. 2 illustrates an exemplary display 200 that can be displayed on display device 140 according to one embodiment. In this embodiment, display 200 is divided into twelve meaning categories 201-212. However, any number of categories can be present. In some embodiments, the meaning categories are displayed on multiple displays 140. In the multiple display embodiments each display 140 can be associated with a specific meaning category or group of meaning categories. For example, all of the documents that come from inside an organization can be displayed on one screen. Another screen can monitor documents discussing the organization in the press, blogs, over the internet, etc. Another screen can monitor correspondence coming into the company from outside the organization. The number of displays can be further increased/decreased depending on the needs of the organization.

Inside each meaning territory are a plurality of "dots" 220. Each dot represents a document whose meaning has been identified to match the defined meaning for the associated meaning territory. Dots 220 are provided as an indication that something is occurring that relates to the associated meaning category. Dots 220 allow a user or manager to look at display 200 and identify any problems as they occur. This dot can be, for example, a red dot, when the document is new and can change color as time goes forward. In another embodiment, the dot can have a start with high brightness and fade over time. Note that while dotes are described herein, any discrete image can be used. Graphical lines or curves can be used to divide the displayed dots into groups added to the display during specified time intervals.

The user can interact with display 200 to obtain information related to the document behind each dot. For example, the user can "zoom" in on a meaning category of interest such as category 207 shown in FIG. 3, by clicking a pointer in the desired area box, such as in box 207. By zooming in to an area, the user can see more readily the individual dots associated with each document in the meaning category, because they all have expanded across the display. Once individual dots can be seen the user can "click-on" an individual dot. By clicking on a particular dot the user can be presented with information related to documents that caused the dot to be displayed. This information can be the document associated with the dot and/or other material. In some embodiments, the user can create a circle around a number of dots to see information related to all the dots inside the circle. The information that is presented can include any information that may be useable by the user in identifying a potential problem. A "lasso" function allows a user to place a contour around a selected set of dots and have all of their content displayed in a single pop-up window.

Figure 3:
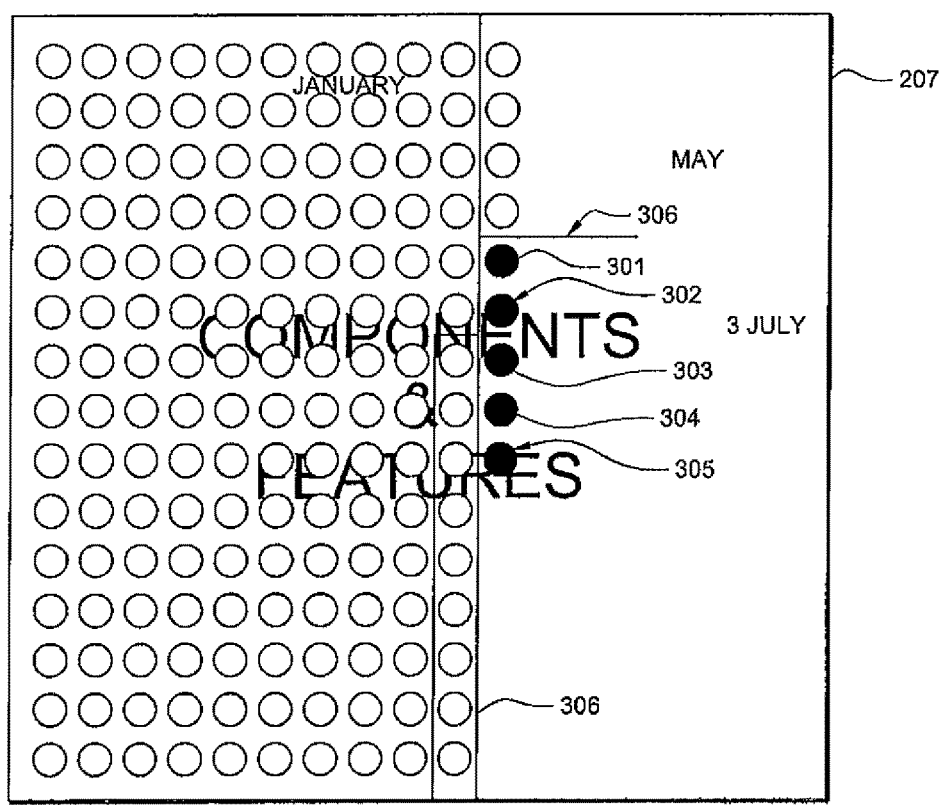
FIG. 3 is a close-up of one meaning territory of FIG. 2.

FIG. 3 is an enlarged view of one meaning territory such as meaning category 207. Five new dots 301-305 are shown that are representative of five new messages. These dots are shown having an indication different from that of the other dots. As discussed above, the newer the dot the more it is emphasized, for example, by color, intensity, blinking, or any other means of differentiation. The user can click on any of these dots 301-305 and obtain more information about the dot. In one embodiment, display 200 is configured to highlight or segregate dots on a predefined criteria, such as date created. An example of the segregation is shown by line 306. This differentiation enables the user to determine if there is a problem or if this is a normal occurrence.

Figure 4:
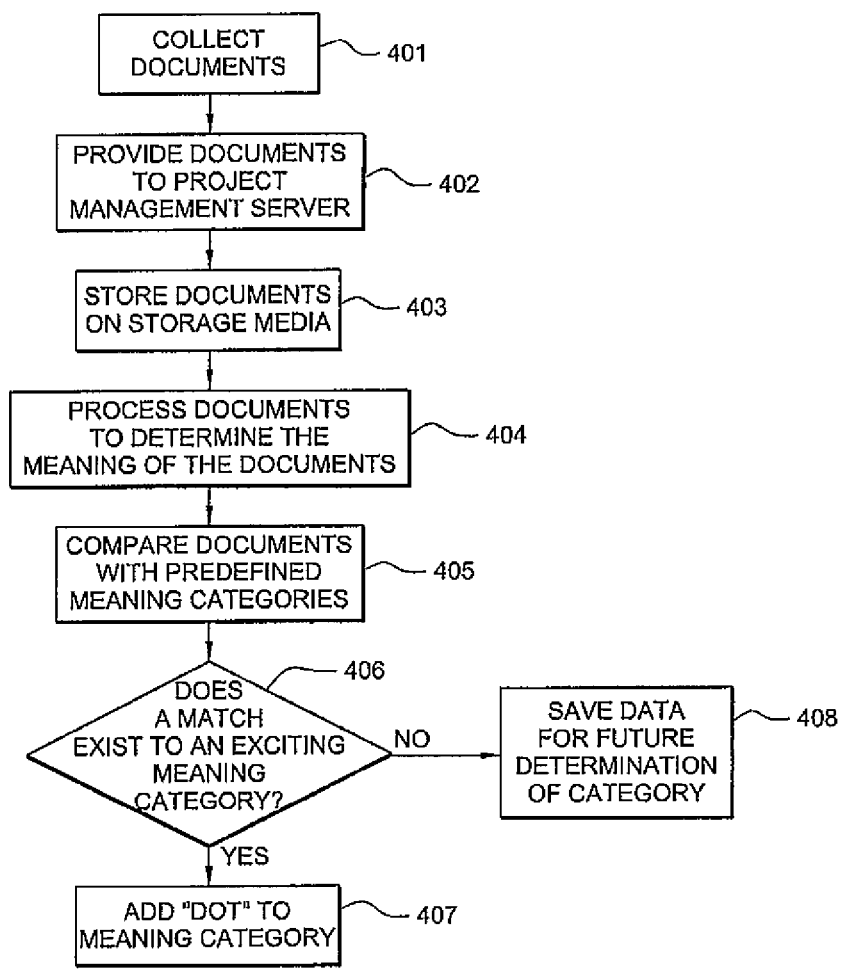
FIG. 4 is a flow diagram illustrating a process for identifying problem areas according to one embodiment.

FIG. 4 is a flow diagram illustrating process 400 executed by project management system 100 according to one embodiment of the present invention. Process 401 collects a plurality of documents on a continuous basis. As discussed above, the plurality of documents can be collected by any known method. Once the documents have been collected process 402 provides the documents to the server. Process 403 places the documents into storage media 125. However, in alternative embodiments the documents can be provided directly to program 130.

Process 404 processes the plurality of documents are processed to determine their respective context vectors. Process 405 then compares the context vectors with stored context vectors that are representative of the desired meaning territories. If process 406 determines that there is a match between the context vectors for each of the documents and the stored context vectors an indication of the match is provided on the display via process 407. If a non-match condition exists with respect to one or more vector then process 408 stores these vectors for later processing, if desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of aiding the management of a project, said method comprising:
   identifying one or more notations from one or more documents associated with the project;
   determining the meaning of the one or more notations;
   comparing the determined meaning of the one or more notations to one or more meaning categories of interest, the one or more meaning categories of interest relating to a previously identified problem associated with the project;
   categorizing, by a program on a server, the one or more identified notations into the one or more meaning categories of interest based, at least in part, on the comparison;
   displaying two or more images as indications that the identified one or more notations are categorized into the one or more meaning categories of interest, wherein each indication represents one of said identified notations and each indication is displayed in a defined location reserved for notations having a like category, wherein displaying said indications within said defined location is an indication of occurrences within a particular category and allows a user to identify problems as they occur;
   gradually over time fading said displayed two or more images to communicate age thereof;
   performing detection of a user created contour around a set of at least two images of the two or more images; and
   displaying, in response to the detection of the user created contour, information related to all of the at least two images inside the contour.

2. The method of claim 1 wherein said notations are in electronic form.

3. The method of claim 1 further comprising:
controlling said time over which said fading occurs.

4. The method of claim 1 further comprising:
selecting which defined locations are available for display at a particular time.

5. The method of claim 1 further comprising:
selecting a representative indication of a particular notation; and
producing a human readable view of a selected particular notation.

6. The method of claim 5 wherein said human readable view is provided on at least one of the following: a display in a defined location, paper, a separate display.

7. The method in claim 5 further comprising:
compiling said human readable view in conjunction with a plurality of other selected notations associated with other selected ones of said displayed representative notations.

8. The method of claim 1 further comprising updating said one or more meaning categories of interest.

9. The method of claim 1 wherein said comparing comprises:
comparing context vectors associated with said identified notations to context vectors associated with said one or more meaning categories interest.

10. The method of claim 1 wherein said indication is a dot and said defined location is an area enclosed by four lines.

11. The method of claim 1, wherein the information related to all of the at least two images inside the contour is displayed in a single pop up window.

12. The method of claim 1, wherein the information related to all of the at least two images inside the contour corresponds to documents associated with all of the at least two images.

13. A machine product comprising:
a non-transitory computer-readable medium having program code recorded thereon, the program code comprising:
code for defining areas on a display, each of said areas uniquely associated with a particular topic;
code for controlling a display of two or more individual images, each image representing a particular notation of at least a portion of a document, said notation pertaining to one of said topics;
code for grouping said notations into one or more meaning categories, said grouping based, at least in part, on a comparison between said identified notations and said one or more meaning categories;
code for gradually over time fading said two or more displayed individual images to communicate age thereof;
code for performing detection of a user created contour around a set of at least two individual images of the two or more individual images; and
code for displaying, in response to the detection of the user created contour, information related to all of the at least two individual images inside the contour,
wherein each said image is displayed within a defined topic area corresponding with said image and said meaning category to indicate occurrences within a particular category and to allow a user to identify problems as they occur.

14. The machine product of claim 13 further comprising:
code operating in response to a selection of a particular image for retrieving an abstract represented by said selected particular image.

15. A system for managing complex projects, said system comprising:
means for assigning abstracts to various portions of documents pertaining to a project;
means for capturing notations from said documents;
means for determining the meaning of the captured notations
means for matching said captured notations with said assigned abstracts, said matching based, at least in part, on a comparison between the meaning of said captured notations and the meaning of said assigned abstracts;
means for displaying two or more of said captured notations in an area reserved for notations having like-assigned abstracts to indicate occurrences pertaining to said like-assigned abstracts and to allow a user to identify problems as they occur;
means for gradually over time fading said displayed two or more captured notations to communicate age thereof;
means for performing detection of a user created contour around a set of at least two notations of the two or more captured notations; and
means for displaying, in response to the detection of the user created contour, information related to all of the at least two captured notations inside the contour.

16. The system of claim 15 further comprising:
means for changing, as a function of time, each displayed notation.

17. The system of claim 16 further comprising:
means for concurrently displaying a plurality of said assigned abstracts.

18. The system of claim 17 further comprising:
means for allowing a user to predefine abstract areas on said display.

19. The system of claim 18 wherein said allowing means comprises:
means for allowing a user to customize selected ones of said abstract areas.

20. The system of claim 15 wherein said documents comprise documents discussing an organization in selected ones of a list consisting of: press, blogs and internet communications.

21. A method of identifying problems in the management of projects, said method comprising:
identifying one or more notations from one or more documents associated with the project;
determining the meaning of the one or more notations;
comparing the determined meaning of the one or more notations to one or more meaning categories of interest, the one or more meaning categories of interest relating to a previously identified problem associated with the project;
categorizing, by a program on a server, the one or more identified notations into the one or more meaning categories of interest based, at least in part, on the comparison;
displaying two or more images as indicators having particular visual characteristics, wherein each indicator represents one of said identified notations and each indicator is displayed in a defined location of a plurality of defined locations, said defined locations separate from each other, wherein each defined location of said plurality of defined locations is reserved for notations having a like category, wherein displaying said indicators within said defined locations is an indication of occurrences within a particular category and allows a user to identify said problems as they occur, wherein a speed at which indicators appear in a particular defined location signifies a problem and wherein said particular visual characteristics fade gradually as a function of time to communicate age thereof;

performing detection of a user created contour around a set of at least two images of the two or more images; and displaying, in response to the detection of the user created contour, information related to all of the at least two images inside the contour.

\* \* \* \* \*

UNITED STATES PATENT AND TRADEMARK OFFICE
CERTIFICATE OF CORRECTION

PATENT NO. : 9,760,553 B1  
APPLICATION NO. : 11/839328  
DATED : September 12, 2017  
INVENTOR(S) : Robert Hecht-Nielsen It is certified that error appears in the above-identified patent and that said Letters Patent is hereby corrected as shown below:

In the Specification

At Column 1, Line number 25, delete "tipper" and replace with --upper--.

In the Claims

At Column 7, Claim number 9, Line number 28, delete "categories interest" and replace with --categories of interest--.
At Column 8, Claim number 15, Line number 24, delete "two notations" and replace with --two captured notations--.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*